United States Patent
Perritt, Jr.

(10) Patent No.: US 12,153,452 B1
(45) Date of Patent: Nov. 26, 2024

(54) SYSTEM AND METHOD FOR EXECUTING SEARCH WARRANT BY AERIAL VEHICLE

(71) Applicant: Henry Hardy Perritt, Jr., Charlottesville, VA (US)

(72) Inventor: Henry Hardy Perritt, Jr., Charlottesville, VA (US)

( * ) Notice: Subject to any disclaimer, the term of this patent is extended or adjusted under 35 U.S.C. 154(b) by 0 days.

(21) Appl. No.: 18/774,837

(22) Filed: Jul. 16, 2024

(51) Int. Cl.
| | |
|---|---|
| *G05D 1/82* | (2024.01) |
| *G05D 1/222* | (2024.01) |
| *G06Q 50/26* | (2012.01) |
| *G05D 1/243* | (2024.01) |
| *G05D 1/248* | (2024.01) |
| *G05D 105/85* | (2024.01) |

(52) U.S. Cl.
CPC .............. *G05D 1/82* (2024.01); *G05D 1/222* (2024.01); *G06Q 50/265* (2013.01); *G05D 1/243* (2024.01); *G05D 1/248* (2024.01); *G05D 2105/85* (2024.01)

(58) Field of Classification Search
None
See application file for complete search history.

(56) References Cited

U.S. PATENT DOCUMENTS

| | | | | |
|---|---|---|---|---|
| 2003/0065678 | A1* | 4/2003 | Mansoori | G06Q 10/10 |
| 2016/0373699 | A1* | 12/2016 | Torres | G08G 1/04 |
| 2019/0297462 | A1* | 9/2019 | Aljadeff | G01S 13/88 |
| 2022/0026929 | A1* | 1/2022 | Foster | B64D 45/00 |
| 2024/0012432 | A1* | 1/2024 | Wiegman | G05D 1/82 |
| 2024/0111305 | A1* | 4/2024 | Bradley | B64U 70/93 |

FOREIGN PATENT DOCUMENTS

| | | |
|---|---|---|
| CN | 110663074 B | 6/2022 |
| CN | 108886514 B | 11/2022 |

OTHER PUBLICATIONS

Skjervold et al., "Autonomous, Cooperative UAV Operations using COTS Consumer Drones and Custom Ground Control Station", Milcom 2018 Track 4—System Perspectives, 2018 IEEE Military Communications Conference (MILCOM), Oct. 29-31, 2018, pp. 486-492 (Year: 2018).*
Shakhatreh et al., "Unmanned Aerial Vehicles (UAVs): A Survey on Civil Applications and Key Research Challenges", IEEE Access , Apr. 22, 2019, pp. 48572-48634 (Year: 2019).*
Carnivore, Wikipedia, https://en.wikipedia.org/wiki/Carnivore_(software).

* cited by examiner

*Primary Examiner* — Tamara L Weber
(74) *Attorney, Agent, or Firm* — Henry H. Perritt, Jr.

(57) ABSTRACT

A system and method that take the constraints of a search warrant, process them digitally, and transfer them into the navigation system of an aerial vehicle so that the aerial vehicle executes surveillance and search under the control of a human operator without flying outside the constraints, thus ensuring that the search does not violate the law or exceed the constraints of the warrant.

8 Claims, 7 Drawing Sheets

SYSTEM AND METHOD FOR EXECUTING SEARCH WARRANT BY AERIAL VEHICLE

CROSS-REFERENCES TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL

Not applicable

STATEMENT REGARDING PRIOR DISCLOSURES BY THE INVENTOR OR A JOINT INVENTOR

Not applicable

FIELD OF THE INVENTION

Aerial searches and surveillance pursuant to search warrants.

BACKGROUND OF THE INVENTION

Involuntary searches long have played a major role in criminal justice systems. Persons suspected of committing crimes can be convicted only based on admissible evidence. Fruits of crimes, instrumentalities of crimes, and other evidence of criminal conduct often is under the control of the suspect, who will not voluntarily make it available. The law must provide some mechanism to force disclosure of potential evidence to law enforcement authorities. The classic means of doing that is a search warrant, known since Blackstone's day. Unlimited search warrants were a major source of controversy leading to the American Revolution.

A search conducted pursuant to a search warrant is an authorized search.

The Fourth Amendment to the United States Constitution, binding on the states as well as federal authorities, circumscribes the issuance of search warrants: "No warrants shall issue, but upon probable cause, supported by oath or affirmation, and particularly describing the place to be searched, and the persons or things to be seized." A rich collection of judicial opinions has elaborated on these requirements. Now it is generally accepted that the search warrant must be issued by a judicial officer, that it must be based on probable cause to believe that fruits, instrumentalities, or evidence of crime are located at the place to be searched, that it must impose explicit constraints on the places to be searched and the things to be searched for. In addition, the law of many states also requires constraints to be imposed on the time of day during which search warrants may be executed and the manner in which executing officers must announce their presence before entering private spaces.

Search warrants, to be valid, must be authorized and signed by legal authority as defined by the laws of the jurisdiction that encompasses the target of the proposed search. Search warrants constrain the scope of authorized searches, geographically or spatially; temporally, by time of day, and by causing the warrant to expire after a period of time; and by subject matter.

Most other national states impose similar requirements, as does international human rights law.

Searches exceeding the geographic, temporal, or subject-matter constraints of the warrant violate the law. "Geographic" and "spatial" refer to the same type of constraint.

Technology available to conduct searches and surveillance constantly evolves. Still-photograph and video cameras are commonly used; as are infrared sensors; and laser imaging devices. Sometimes acoustic sensors, chemical sensors, and radiation sensors are necessary to perform the search or surveillance effectively.

Cell site simulators, also known as "IMSI catchers," "Stingrays," "Hailstorms," and "dirt boxes" (Digital Receiver Technology-"DRT") perform electronic searches. They intercept connection signals constantly transmitted by cellphones and other devices to keep the devices linked to service-provider cell towers. Cellular devices constantly transmit their International Mobile Subscriber Identification ("IMSI"), which uniquely identifies the device. Cell site simulators may be deployed by law enforcement personnel or others without involving a service-provider to locate and track a particular cellphone.

Judicial authority from decided cases is mixed on whether a a search warrant is required for the use of cell site simulators, whether a less demanding judicial order known as a "tracking order" or a "trap and trace" order suffices, or whether the devices may be used without any form of judicial approval. The law is evolving, and a particular deployment of a cell site simulator might be found to be invalid after the fact if it is not authorized by a court.

In some cases, search warrant constraints have been enforced technologically by integrating them into search tools. The FBI's Carnivore system is an example, in which packet sniffers used to search for evidence in electronic form were modified to honor search warrant constraints.

Aerial searches have become a common tool of law enforcement, sometimes being the only way to collect certain types of evidence, such as that located in a large expanse of private land to which admission is denied, or that located inside high and opaque enclosures such as fences or walls. Often such potential evidence is not visible from the boundaries of the private property but is visible from an overhead vantage point.

In addition, not only traditional optical photography is useful when deployed overhead. Infrared photography and laser generated imagery, combined with acoustic data collection and chemical and radiation data collection is useful, and sometimes the only way of obtaining particular types of evidence.

The effectiveness of such devices depends on their being operated at a proper altitude above the ground, because the range of radio signals is proportional to the height of the transmitting and receiving antennas; a higher receiving antenna on a cell site simulator can "hear" more cellular devices.

Five different tools are available to conduct overhead searches: fixed-wing manned aircraft, manned helicopters, fixed-wing drones, rotorcraft drones, and satellites in low earth or geosynchronous orbit.

Satellite surveillance is generally outside the the reach of the Fourth Amendment and the other laws restricting searches.

Fixed-wing aircraft and drones can be useful for searching large areas, but they must be flown at speeds exceeding their stall speeds of 60 or 70 knots in order to stay in the air, and this constraints the ability of the aircraft and their sensors to detect items that may be of interest.

Manned rotorcraft and rotorcraft drones eliminate the problem resulting from minimum speeds; they can hover in place over an item of potential interest until all relevant data about it has been collected. But manned helicopters are expensive and most law-enforcement agencies cannot afford them. They also present safety threats to their crew in certain flight profiles, including hovering at low altitudes.

Small rotorcraft drones, such as those marketed by the Chinese company DJI, which has about 80% of the market, are available for few thousand dollars and have sophisticated navigation and control and sophisticated cameras likely to be well suited for overhead searches and surveillance.

Drones are unpopular with the public, however, which is hypersensitive to potential invasions of privacy resulting from their use, especially when they are used by the government. The result has been the adoption of statutory constraints in many states that prohibit law enforcement authorities from using drones unless pursuant to a search warrant. The result of these anti-drone initiatives has been the underuse of drones for legitimate search and surveillance by law-enforcement. Law-enforcement agencies equipped with drones are deterred by the delay and inconvenience of seeking search warrants, and they worry that, even if they get a search warrant, evidence collected by drone will be too vulnerable to suppression pursuant to pretrial motions or used to overturn convictions because of the difficulty in proving that the drone was flown only in accordance with constraints imposed by the warrant and that it collected only evidence authorized by the warrant.

Law-enforcement and the public need a system that will permit drones to be used to execute search warrants with technological guarantees that the drones will be flown only in accordance with the constraints imposed by the warrants.

BRIEF SUMMARY OF THE INVENTION

The system and method allow searches and surveillance authorized by search warrants to be conducted by aerial vehicles automatically constrained to operate only within the confines of the search warrant.

Law enforcement officers and judicial officers increasingly rely on automated electronic-warrant (e-warrant) systems that connect the applicant for a search warrant to a judicial officer authorized to issue one remotely, typically through messaging or videoconferencing implemented in the Internet. When such e-warrant systems are used, the system and method take the digital representation of a search warrant and input its values directly into a module of the system. If a digital representation of the warrant is not available, the system allows law enforcement officers to enter warrant details manually by keyboard, simulated keyboard on a touchscreen, or orally, by speaking into an attached microphone.

The system then processes and translates the entered values into a form that can be integrated with the aerial vehicle's built in flight control system, circumscribing its maneuvers to make sure the aerial vehicle remains within the warrant constraints.

The preferred embodiment uses an off-the-shelf rotorcraft drone as the aerial vehicle, but the system also can be deployed on fixed wing drones, manned helicopters, and manned fixed wing aircraft.

The system allows collection of various types of imagery and data, including still photographic images, full-motion video images, infrared imagery, laser imagery, acoustic data, chemical data, radiation data, and wireless data indicating the location of the cellular device. The imagery and data is packaged in a form readily useful to investigators, judges, prosecutors and other lawyers, and juries.

The system and method rely to the maximum extent practicable on off-the-shelf components, taking advantage of considerable sophistication in the drone marketplace and not burdening a law enforcement agency or its vendors to reinvent the wheel.

BRIEF DESCRIPTION OF THE DRAWINGS

To identify the discussion of any particular element or act easily, the most significant digit or digits in a reference number refer to the figure number in which that element is first introduced.

DETAILED DESCRIPTION OF INVENTION

Figure 1:
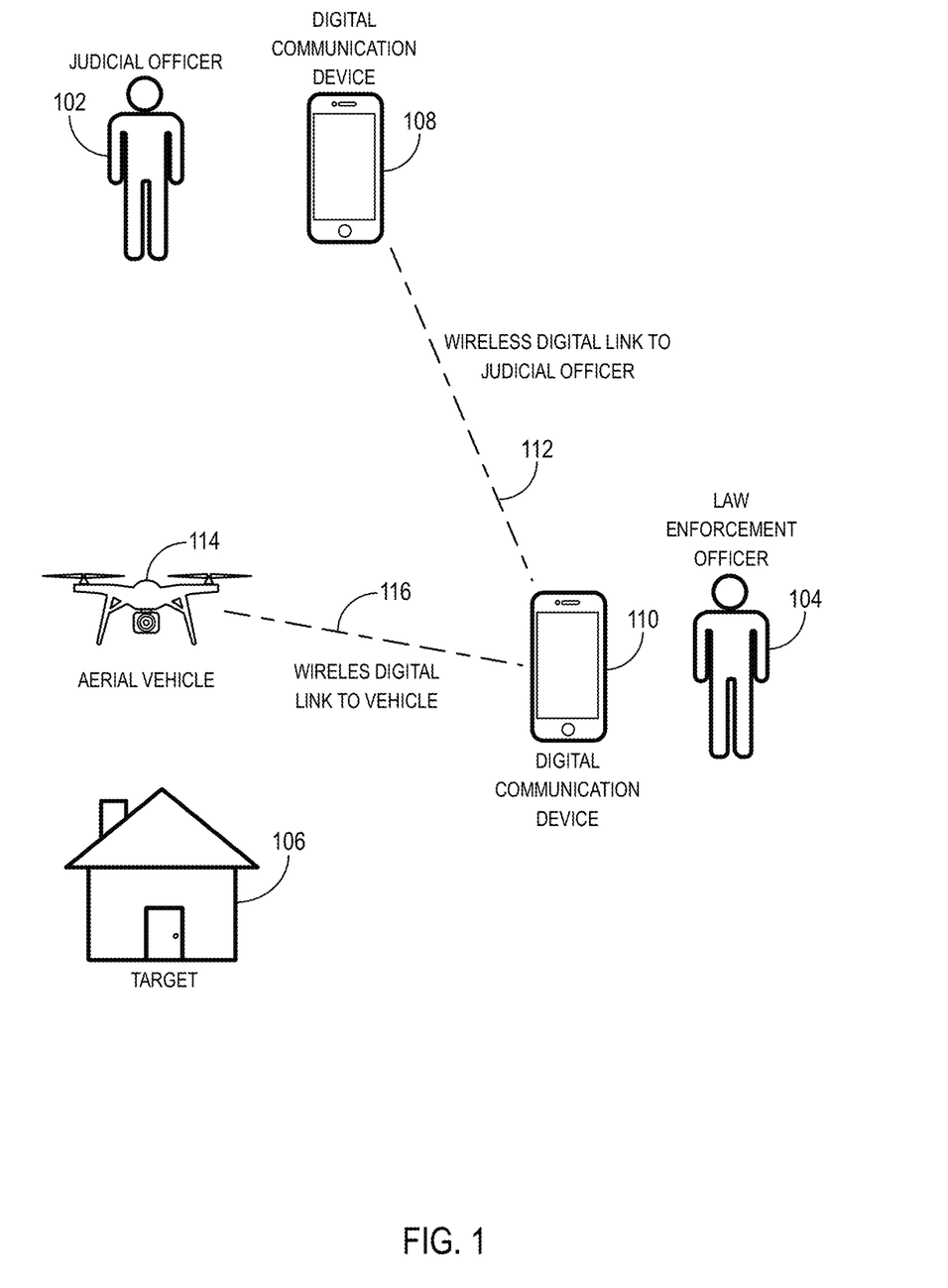
FIG. 1 provides a comprehensive review of the participants in the system.
Figure 2:
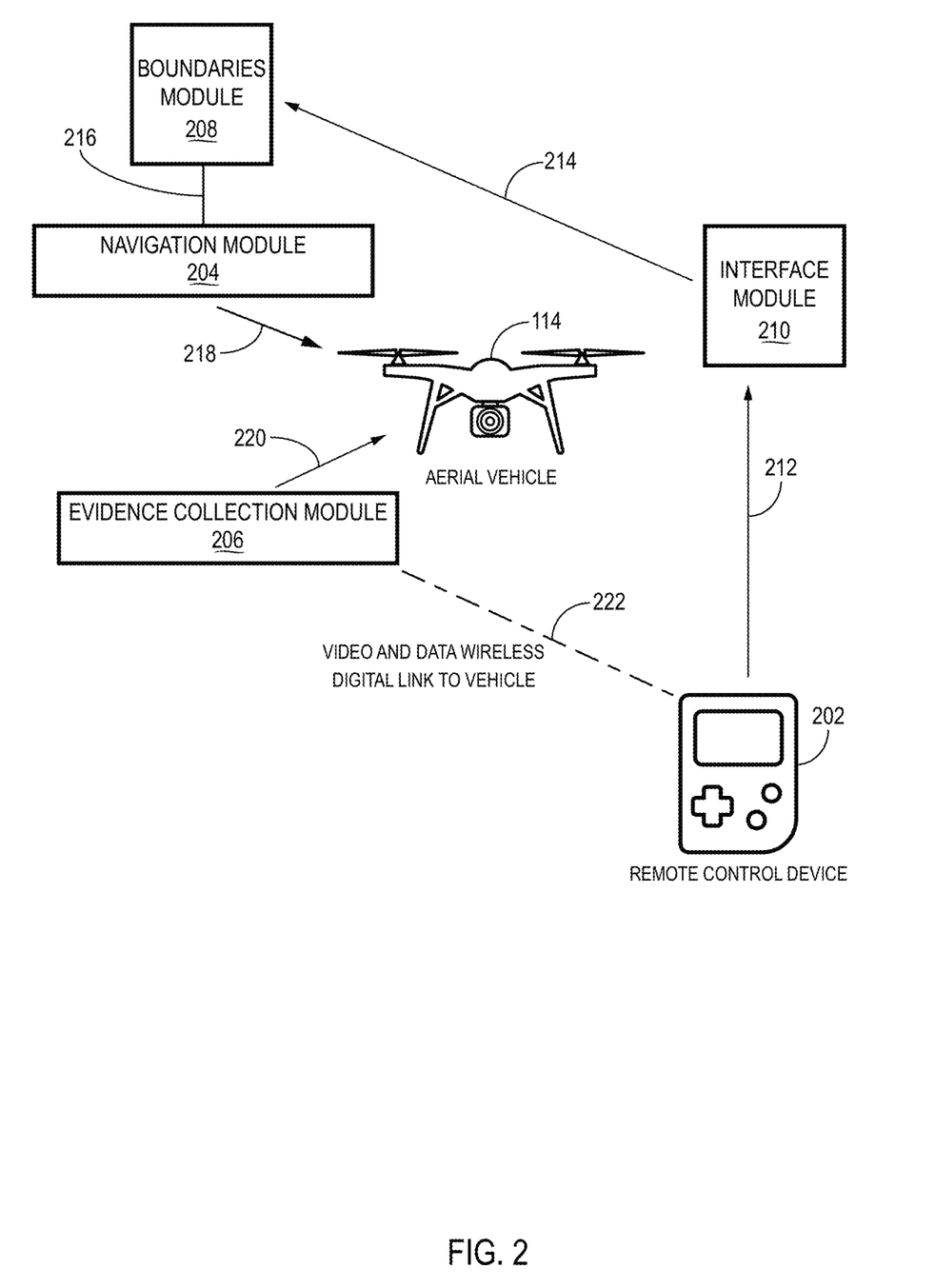
FIG. 2 depicts the major subsystems.

The system and method integrate electronic warrant systems with aerial vehicle control technology to permit aerial vehicles 114 to conduct overhead surveillance and searches pursuant to search warrants. Target-identification, geographic, temporal, and subject-matter constraints in the warrant are mandatorily enforced in the aerial vehicle system so that the aerial vehicle 114 is incapable of violating the warrant's scope.

The technique used is known as "geofencing." Geofencing technology comprises software-implemented virtual boundaries or fences around specified geographic location. The software disables commands to the vehicle that would cause it to fly outside the geofence.

A law enforcement officer 104 obtains a search warrant pursuant to applicable state or federal law by using any one of several commercially available electronic warrant ("e-warrant") systems. These electronic warrant systems link judicial officers' 102 digital communication devices 108 and the digital communication devices 110 of law enforcement officers 104 applying for warrants electronically so they need not be in the same location to interact with each other. The law enforcement officer 104 uses a digital communication device 108 connected to the Internet or another communications network to which the judicial officer's digital communication device 110 also is connected. Each digital communication device 110 accepts, from the law enforcement officer 104 information required by law to constitute probable cause, such as affidavits, and a description of the content of the warrant being requested. By clicking icons, entering text, by creating audiovisual recordings, or by participating in a live audiovisual link, the law enforcement officer 104 provides the judicial officer 102 through the wireless digital link to the judicial officer 212 with information sufficient for the judicial officer 102 to determine whether a warrant should issue. If the judicial officer 102 decides that the law authorizes a warrant, he or she clicks icons and enters text describing the target of the warrant, its scope and duration, and an electronic signature on his digital communication device 108.

The e-warrant system then communicates to the applicant via the wireless digital link to judicial officer 112 that the warrant has been approved and makes its text available to him in electronic or paper form on his digital communication device 110, at his option.

The interface module 210 is an application program interface ("API") configured to match, or to translate the constraints expressed in the warrant into machine-readable quantities (a "set of quantitative values") that can be processed by the boundaries module 208. If the warrant contains time constraints, for example prescribing that it may be executed only in the daytime, the Interface module 210 also processes those constraints into a form that can be applied by the boundaries module 208.

An application program interface is a set of data structures and algorithms that permit one computer program (an "application") to communicate with another application or with a human user.

Figure 4:
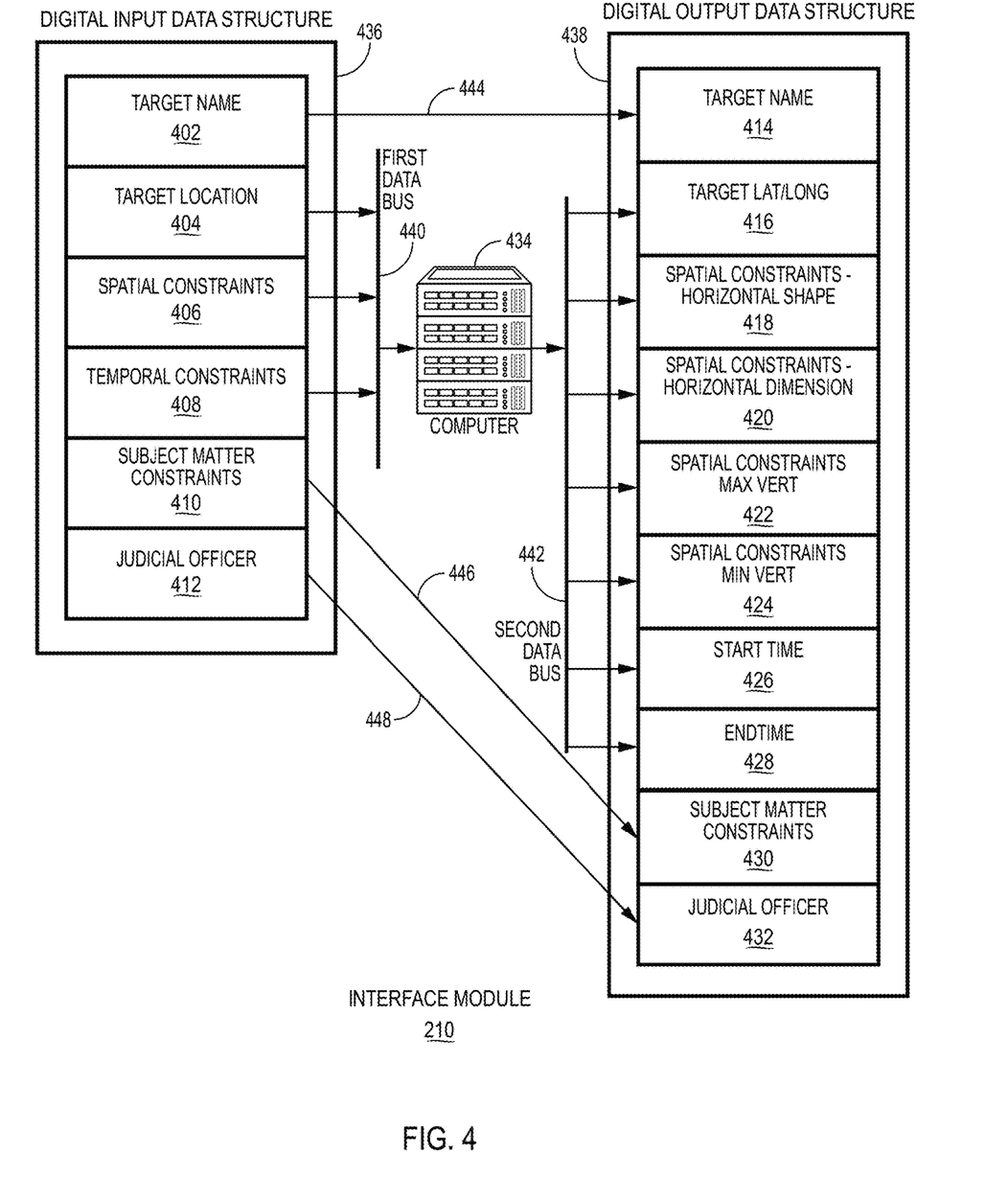
FIG. 4 depicts the input and output data structures of the interface module

The Interface module 210 has input devices permitting it to receive digital input data structures 436 (a first set of quantitative values) directly from e-warrant applications, or alternatively permitting the operator to input data by using a keyboard or a microphone. This input process can be referred to as "loading the warrant into the system."

Figure 5:
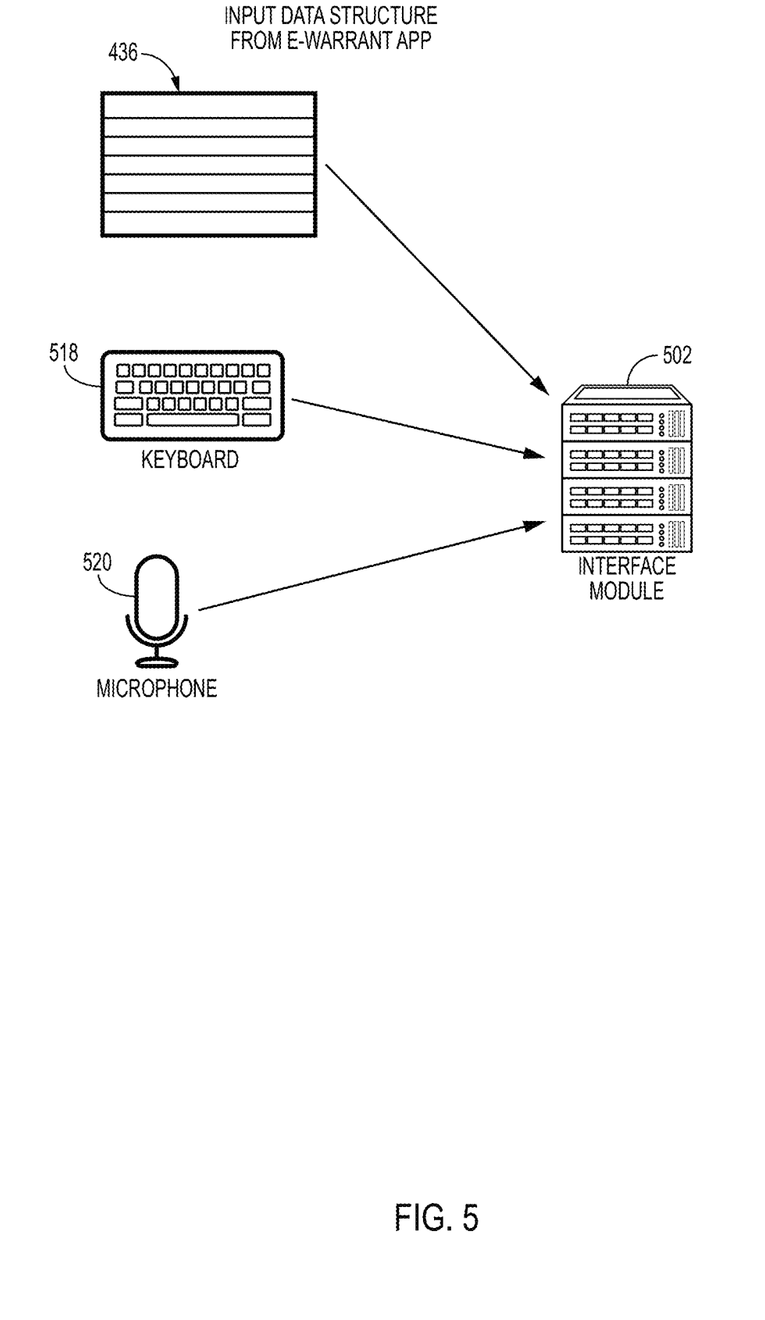
FIG. 5 shows alternative input methods for the interface module

When a digital input data structure 436 is available from the e-warrant application, the values in free text form—target name 502, subject matter constraints 410, and judicial officer 412—are copied directly into the digital output data structure 438 by the Interface module 210. Quantitative values, such as the target location 404, spatial constraints 406, and temporal constraints 408, are communicated via a first data bus 440 to an onboard computer 434 for translation and mapping via a second data bus 442 onto quantitative values such as latitude and longitude in the digital output data structure 438.

In some jurisdictions, it is the practice of law enforcement officers is to include detailed latitude and longitude of the target for a search warrant. The template for a search warrant published by the Administrative Office of U. S. Courts (AO 93 11/13) has check boxes for daytime or nighttime search authorizations and large text boxes for a description of the place to be searched and the property to be seized. constraints on the search would be implied from or explicit in the text entered. The interface module 110 uses artificial intelligence natural language techniques to parse the input values into usable output values represented in a digital output data structure 438 (a second set of quantitative values).

The system and method can an use off-the-shelf e-warrant products as is, in which case the interface module 210 may perform more work to translate free-form text entries in the warrant to a set of quantitative values in a form that can be processed by other elements of the system. Alternatively, users of the system and method can collaborate with e-warrant vendors to tailor human interfaces for judicial officers 102 and law enforcement officers 104 (108 and 110) so they directly see and can change values used by the aerial vehicle 114.

When no set of quantitative values in the form of a digital input data structure 436 is available from an e-warrant application, relevant warrant contents may be entered manually by on a keyboard 518 or simulated keyboard on the remote control device 202 touch screen, or by speaking the contents into a microphone 520 after which speech to text algorithms in the Interface module 210 translates the spoken words into quantitative valuables usable by other elements of the system.

The navigation module 204 is built into the drone, and delivered with it. It has a radio receiver capable of receiving commands from the remote control device. It makes use of onboard Global Positioning System ("GPS") receivers, inertial measurement units ("IMUs"), magnetic compasses, barometric altimeters, and Lidar and radar, which provide positional inputs to determine the drone's position at all times, to detect minute changes in position, and to process operator commands from the remote control module that execute such flight commands, causing the drone to move forward, backward, sideways, to ascend or descend, to speed up, or hover. The navigation module 204 also receives time signals from GPS satellites and keeps an onboard clock updated to the correct time.

Figure 3:
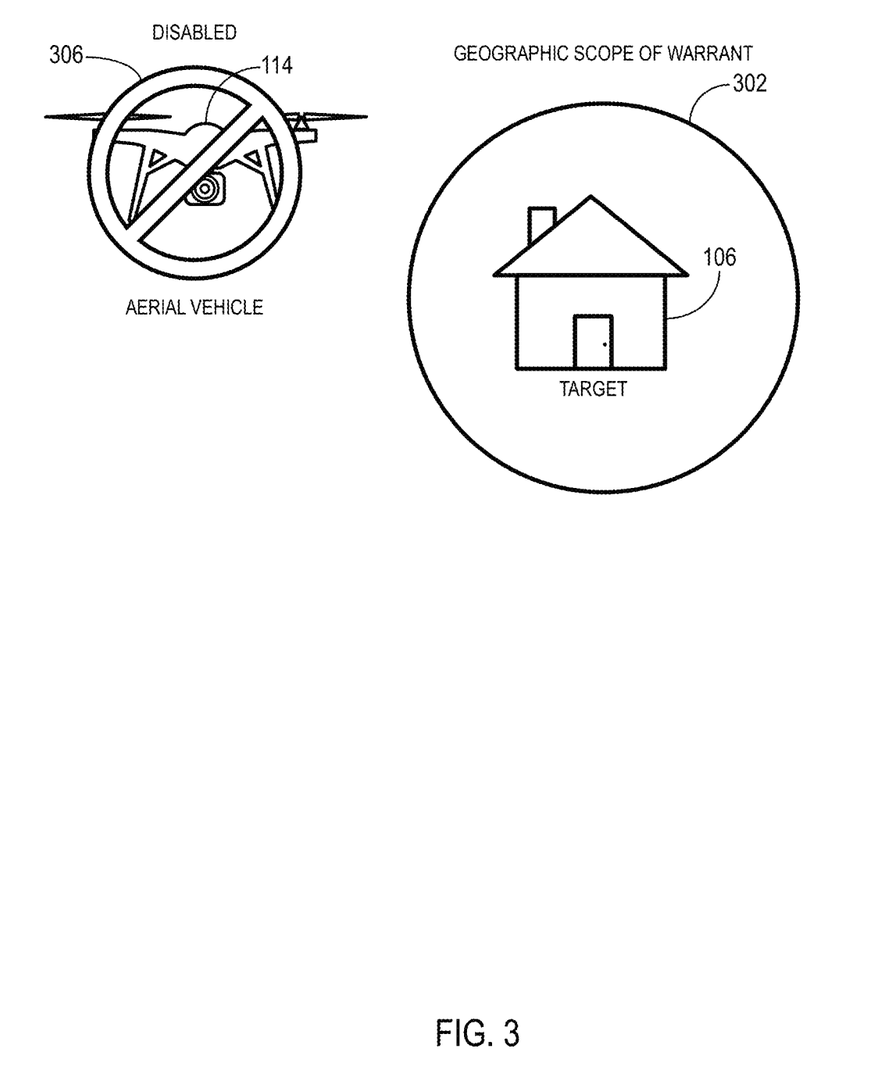
FIG. 3 illustrates how aerial vehicle flight outside the geographic scope of the warrant is Disabled.

The boundaries module 208 determines the latitude and longitude of the target 106 and obtains the current latitude, longitude, and altitude—the position—of the aerial vehicle 114 from the navigation module 204. It compares the position of the aerial vehicle 114 with the latitude, longitude, and altitude expressed by the constraints in the warrant and communicated by the Interface module 210. Once the aerial vehicle 114 is in flight and over the target 106, when the vehicle position obtained from the navigation module 204 indicates that the vehicle is about to exceed the constraints imposed by the warrant, the boundaries module 208 sends commands to the navigation module 204 preventing flight outside the allowable area. The boundaries module 208 also compares the current time within the time constraints derived from the warrant and commands the aerial vehicle 114 to exit the area over the target rather than violating those time constraints.

The boundaries module 208 sends a message in the form of a defined data structure to the airborne vehicle's navigation module 204 when the vehicle is about to enter a predefined geographic area, in response to which the navigation module 204 causes the aerial vehicle 114 to adjust its flight path in accordance with the message, regardless of its preprogrammed flight path or the flight path commanded through the remote control device 202.

The message from the boundaries module 208 comprises at least one or a combination of instructions, constraints, constraints, directions, direction changes, bearing changes, or altitude changes. By selecting appropriate content in the boundaries module 208 message, associated with a particular geographical area, a location-related restriction of the flight path of the aircraft may be achieved. For example, an unmanned aerial vehicle may be prevented from operating beyond a certain radius from an outbuilding.

The boundaries module 208 allows the aerial vehicle 114 to take off outside the geographic scope of the warrant 302 and to return for landing outside the geographic scope of the warrant 302 but disables the camera and other sensors when the aerial vehicle 114 is outside that area. During such takeoff and landing operations, the boundaries module 208 allows aerial vehicle 114 flight only directly to and from the geographic scope of the warrant 302. "Scope" may refer to geographic, temporal, or subject-matter scope.

In one embodiment, the boundaries module 208 may disable the aerial vehicle 114 from operating unless its has been loaded with a search warrant currently in effect for an area proximate to the aerial vehicle's 114 location, The boundaries module 208 writes information to the screen of the remote control device 202, allowing the operator to see the position of the aerial vehicle 114 with respect to spatial constraints 406, to determine compliance with temporal constraints 408, and to see subject matter constraints 410 at the same time he sees imagery being collected by the evidence collection module 206.

When the boundaries module 208 blocks an action otherwise enabled by the navigation module, this is referred to as "disabling" or "not permitting" the action.

While the aerial vehicle 114 is flying within the area allowed, its evidence collection module 206 uses sensors to capture photographic, infrared, and laser imagery via appropriate optical and laser devices and also may collect acoustic, chemical, or radiation data according to the nature of the search or surveillance.

Figure 6:
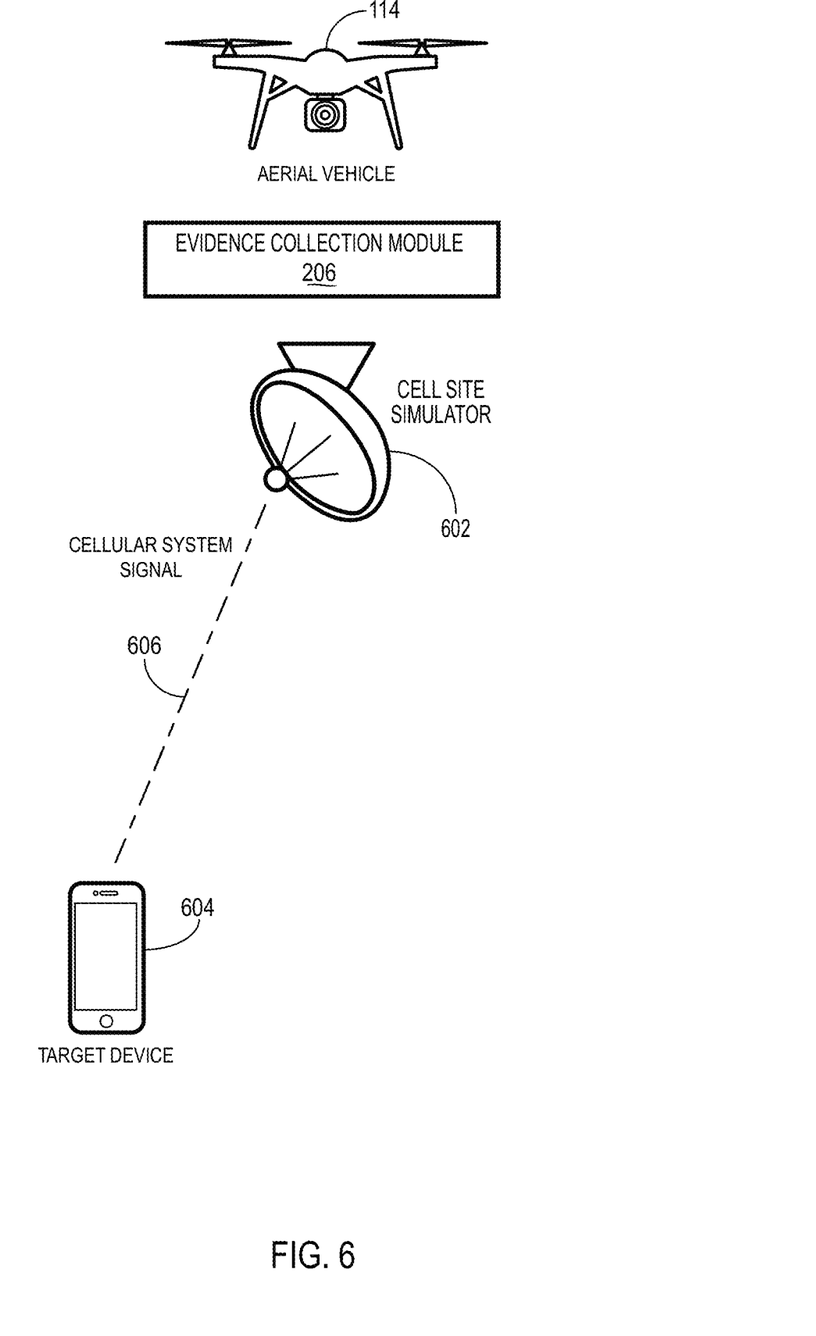
FIG. 6 shows a cell site simulator in use.
Figure 7:
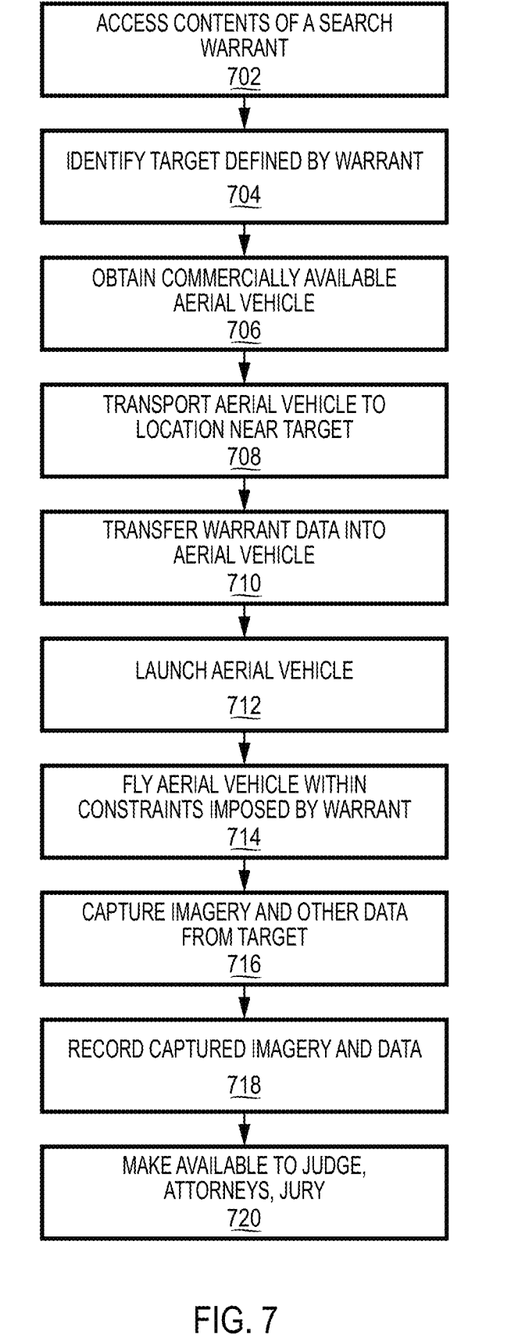
FIG. 7 is a flowchart depicting the steps in the use of the system and the method.

The evidence collection module 206 also may carry a cell site simulator 602 to track cellphones and similar devices connected to the cellular network, as shown in FIG. 6. The cell site simulator 602 intercepts cellular system signals 606 from a target device 604 allowing the position of the target device 604 to be tracked. When the aerial vehicle 114 carries a cell site simulator 602, a search warrant or tracking or "pen trap" order may impose geographic, temporal, and subject matter constraints, which are enforced on aerial vehicle 114 operations in the same way they are for the use of other types of sensors.

Several of the modules make use of an on-board computer that performs logical operations by applying algorithms to data structures, including logical operations that translate values from one form into another.

In a typical off-the-shelf aerial vehicle 114 system including a remote control device 202 the vehicle and the remote control device together contain elements of sophisticated computer system that stabilizes the aerial vehicle 114 while it flies or hovers, that accepts operator commands entered on the remote control device 202 and causes the vehicle to fly the flight path commanded, that causes the aerial vehicle 114 to fly a pre-programmed route, with respect to objects indicated by the operator on the touch screen of the remote control device 202, and that allow the operator to active the camera and other sensors to capture imagery and other data and to download the captured information to the remote control device 202.

The operation of the interface module 210 and boundaries module 208 modules does not interfere with the operator's ability to make full use of the capabilities delivered with the aerial vehicle 114 and its remote control device 202 to perform these functions within the constraints of the warrant. The interface module 210, the navigation module 204, and the boundaries module 208 supplement the functions delivered with the remote control device 202 to allow the operator to visualize the warrant constraints and to disable the aerial vehicle 114 from operating outside those constraints.

The remote control device 202 delivered with the aerial vehicle 114 communicates with the aerial vehicle 114 by means of a video and data wireless digital link 222 to the vehicle 114. This video and data wireless digital link 222 may be WiFi, a cellular telephone data connection, or a proprietary wireless link like DJI's Datalink or Lightbridge.

The built-in video transmission features of the aerial vehicle 114 transmit the imagery and data being captured by the sensors of the evidence collection module 206 in real time back to the operator through the video and data wireless digital link to vehicle 222. The operator is responsible for monitoring that video and data feed and applying any subject matter constraints in the warrant by redirecting the aerial vehicle 114 or by turning sensors off momentarily.

The imagery and data captured by the evidence collection module 206 and recorded are made available in a form usable by investigators, prosecutors, judges, other attorneys, and juries.

The aerial vehicle 114 and the several modules make use of one or more digital computer 434 processors. The aerial vehicle 114 is delivered with one such computer processor, and the remote control device 202 with another. These computers may have sufficient capacity to handle the additional processing loads imposed by the modules. Other embodiments of the system, however, make use of one or more modules each having its own computer processor 434.

Typically, an unmanned vehicle would be transported on the ground to a staging area near the target under the control of the law enforcement agency, where the warrant data would be transferred to it via its Interface module 210. After the transfer, the vehicle would be launched and flown over the target.

A manned vehicle typically would be flown to a rendezvous point near the target area and would receive the warrant data through an uplink from the remote control device 202 and the Interface module 210, after which it would fly over the target.

The evidence collection module 206 records the imagery and data thus collected and transmits it to the ground to the remote control device 202, from which it is made available to judges, investigators, prosecutors and defense attorneys, and juries according to the rules of evidence.

In one embodiment, the aerial vehicle 114 is an off-the-shelf commercially available rotorcraft (a "drone"), the software embedded in the drone, and the remote control device delivered with it. It is modified by APIs comprising the interface device and the constraints device. Commercially available drones of this sort typically have endurance times approximating 45 minutes, adequate for the execution of most warrants for overhead surveillance and searches.

The telemetry built in to the drone augments the audit trail typically provided for in e-warrant products.

In a second embodiment, the aerial vehicle 114 is an off-the-shelf commercially available fixed wing aircraft.

In a third embodiment, the aerial vehicle 114 is a manned helicopter.

In a fourth embodiment, the aerial vehicle 114 is a manned fixed wing aircraft.

In all of these embodiments the sensors that are factory-installed on the vehicle are supplemented as necessary by laser, infrared, acoustic, chemical, and radiation sensors and cell site simulators necessary for the nature of the search and surveillance.

In the embodiments using manned aircraft as the aerial vehicles 114, the functions assigned to the remote control device 202 are moved to the cockpit and performed by the pilot or observer, using autopilot systems appropriate to the particular aircraft.

The operator or pilot of the aerial vehicle 114 may or may not be the same person as the law enforcement officer 104 who applied for the warrant.

The system and method rely, to the maximum extent possible, on commercially available off the shelf components, thus avoiding the cost and inconvenience of designing, building, and deploying functionality that already exists in the marketplace, such as GPS navigation, flight-control systems, inertial measurement units, remote control protocols, and camera controls.

I claim:

1. A system for executing search warrants comprising:
   a search warrant authorized and signed by legal authority as defined by the laws of the jurisdiction that encompasses the target of the search and loaded into the system comprising:
      geographic constraints on the scope of the authorized search;
      temporal constraints on the scope of the authorized search;
      subject-matter constraints on the scope of the authorized search;
   an unmanned aerial vehicle (drone), comprising:
      an interface module that acquires information directly from an e-warrant system through a digital connection, comprising:
         a remote control device;
      an Application Program Interface (API) written to match values provided to the remote control device to those that can be processed by modules in the system;
      a navigation module comprising:
         a GPS receiver;
         a magnetic compass;
         a barometric altimeter;
         an inertial measurement unit (IMU);
      a boundaries module, comprising:
         a first set of quantitative values communicated to the boundaries module from the interface module;
         logic executed on a computer that translates input values into a form that can be processed by the other modules in the system;
         a second set of quantitative values communicated to the navigation module;
         a switch wherein the boundaries module sets the switch so as to disable the unmanned aerial vehicle from operating unless a valid search warrant has been loaded into the system;
      a radio receiver capable of receiving commands from the remote control device;
      one or more computers capable of:
         receiving positional inputs from the GPS receiver, magnetic compass, aerobic altimeter, and IMU and computing from those inputs a latitude and a longitude of the unmanned aerial vehicle;
         receiving commands from the remote control device directing changes in the unmanned aerial vehicle position;
         applying geographic constraints from the search warrant that disable any remote control commands that would cause the unmanned aerial vehicle to exceed those geographic constraints;
         limiting aerial vehicle flight so it occurs only within the warrant constraints;
         executing such flight commands as constrained by the inputs from the boundaries module; and
      an evidence collection module comprising:
         sensors capable of collecting imagery and other data;
         a remote control device, delivered with the unmanned aerial vehicle, capable of communicating with the unmanned aerial vehicle via a wireless digital link to the unmanned aerial vehicle;
      an operator of the system;
      at least one computer aboard the unmanned aerial vehicle; and
      a target.

2. The system of claim 1 wherein the interface module alternatively acquires information from the warrant by the operator's keying them on a keyboard or speaking them into a microphone.

3. The system of claim 1 wherein the evidence collection module comprises a cell site simulator.

4. The system of claim 1 wherein the evidence collection module comprises:
   at least one photographic camera; and
   at least one infrared imaging sensor.

5. The system of claim 4, wherein the evidence collection module also comprises:
   an acoustic sensor.

6. The system of claim 5, wherein the evidence collection module also comprises:
   a chemical sensor.

7. The system of claim 6, wherein the evidence collection module also comprises:
   a radiation sensor.

8. A method for executing search warrants comprising:
   accessing the contents of a search warrant, comprising:
   geographic constraints;
   temporal constraints;
   subject matter constraints;
   identifying a target defined by the search warrant;
   obtaining an unmanned aerial vehicle (drone), comprising:
      an evidence collection module;
      a navigation module;
      a boundaries module;
      an interface module; and
      a remote control device, delivered with the unmanned aerial vehicle;
   reading the geographic, temporal, and subject-matter constraints from the search warrant into an application program interface (API);
   translating the geographic, temporal, and subject matter constraints from the search warrant into quantitative values that can be processed by computer code in the boundaries and navigation modules;
   transmitting search warrant constraints to the unmanned aerial vehicle via a wireless digital link to the unmanned aerial vehicle;
   transporting the unmanned aerial vehicle to a location near the target;
   launching the unmanned aerial vehicle by means of a remote control device delivered with the unmanned aerial vehicle;
   flying the unmanned aerial vehicle within the constraints imposed and enforced by the geographic, temporal, and subject matter constraints, such constraints being enforced by the boundaries module; and
   capturing imagery and other data within the subject matter constraints of the warrant;
   recording the captured imagery and data on a medium usable by investigators, prosecutors, judges, and juries according to the rules of evidence applicable to the warrant at the time of its execution.

* * * * *